United States Patent [19]
Ryan

[11] Patent Number: 5,960,784
[45] Date of Patent: Oct. 5, 1999

[54] BARBECUE GRILL WITH SMOKE INCINERATOR

[76] Inventor: John Patrick Ryan, 186 W. Mill Rd., Long Valley, N.J. 07853

[21] Appl. No.: 09/197,155

[22] Filed: Nov. 20, 1998

Related U.S. Application Data

[63] Continuation-in-part of application No. 09/013,151, Jan. 26, 1998, abandoned.

[51] Int. Cl.$^6$ .................................................... F24C 3/00
[52] U.S. Cl. ...................................... 126/41 R; 126/25 R
[58] Field of Search ................................ 126/25 R, 41 R

[56] References Cited

U.S. PATENT DOCUMENTS

| | | | |
|---|---|---|---|
| 4,128,391 | 12/1978 | Braunstein | 431/354 |
| 4,255,125 | 3/1981 | Auclair et al. | 431/354 |
| 4,724,823 | 2/1988 | Simpson | 126/39 |
| 4,747,391 | 5/1988 | Hanagan et al. | 126/41 R |
| 4,762,059 | 8/1988 | McLane, Sr. | 99/445 |
| 4,878,477 | 11/1989 | McLane | 126/41 R |
| 4,979,440 | 12/1990 | Latour | 99/445 |
| 5,121,738 | 6/1992 | Harris | 126/41 R |
| 5,165,385 | 11/1992 | Doolittle et al. | 126/25 R |
| 5,279,277 | 1/1994 | Barker | 126/41 R |
| 5,313,877 | 5/1994 | Holland | 99/466 |
| 5,505,190 | 4/1996 | Kalenian | 126/41 R |
| 5,582,094 | 12/1996 | Peterson et al. | 99/445 |

*Primary Examiner*—Carroll Dority

[57] ABSTRACT

A barbecue grill has a grill burner and a cooking grate disposed within a housing with an upper portion pivotally mounted on a lower portion. Means is provided for supporting the housing upper portion in a partial open pivotal position. A smoke incinerator is mounted on the housing upper portion, and has a burner for generating a flame. Smoke is converted to invisible exhaust gases by heating the smoke with the flame. A grill burner locking means is provided, which will prevent unignited fuel from accumulating in the housing in the event that the incinerator burner fails to ignite.

20 Claims, 5 Drawing Sheets

1

BARBECUE GRILL WITH SMOKE INCINERATOR

CROSS REFERENCES TO RELATED APPLICATIONS

This application is a continuation-in-part of a previous, pending application assigned Ser. No. 09/013,151, filed in the United States Patent and Trademark Office on Jan. 26, 1998, by John Patrick Ryan and now abandoned, and titled "Barbecue Grill With Radiant Cooking Surface And Smoke Incinerator."

FIELD OF THE INVENTION

This invention relates generally to the field of barbecue grills, and pertains, more specifically, to a gas fired grill having an integral gas fired smoke incinerator.

BACKGROUND OF THE INVENTION

Barbecue grill have become so popular for outdoor home cooking, as well as for commercial use, that they are now a significant source of air pollution in the form of smoke. Increasingly tighter environmental controls demand cleaner burning systems. One way to eliminate smoke is to equip the grill with a flue having an afterburner or incinerator to heat and burn the solid smoke particles which form visible pollution. The particles are converted to invisible gaseous compounds, and are carried up the flue by convection.

An example of an afterburner type smoke incinerator in the prior art is seen in Kalenian, U.S. Pat. No. 5,505,190. A structure is shown which admits smoke from the grill lower housing, burns the smoke in a gas flame, and conveys the gases up a stack.

While the above-described grill smoke incinerator is functional for reducing smoke, it displays shortcomings inherent in it's design. Hot gases and smoke particles tend to rise into the upper housing or lid of the grill, yet the above device takes gases from the lower housing, resulting in a weak convection flow. The incinerator flame is directed into a straight pipe, a geometry not suited for the venturi effect. The incinerator works only while the housing lid is closed, and smoke accumulates within the housing. With the housing lid open, while attending to cooking, hot gases and smoke will escape directly upward.

Accordingly, there is a need to provide a barbecue grill having a smoke incinerator mounted in the housing lid, where full use can be made of the upward convection flow of the hot gases and smoke particles, to fully scavenge all smoke from the housing.

There is another need to provide a barbecue grill of the type described, and having an incinerator burner geometry which will produce a venturi effect, to more aggressively draw the smoke particles from the housing.

There is yet another need to provide a barbecue grill of the type described, and having a means to prevent unignited gas from accumulating in the housing, for safety.

SUMMARY OF THE INVENTION

The above features, as well as further features and advantages, are attained by the present invention which may be described briefly as a barbecue grill, comprising a cooking unit which includes a housing. The housing defines a housing chamber, and has an upper portion and a lower portion. The cooking unit includes a grill burner disposed within the housing. A cooking grate is disposed within the housing and above the grill burner. Mounting means is provided for mounting the housing upper portion on the housing lower portion. A smoke incinerator is mounted on the housing upper portion. The smoke incinerator has an incinerator burner for generating a flame. Smoke is converted to invisible exhaust gases by heating the smoke with the flame.

A method is also disclosed for carrying out the invention, comprising the steps of:

mounting a smoke incinerator on the housing upper portion;

generating a flame with an incinerator burner;

communicating the burner with a combustion chamber;

communicating the combustion chamber and the housing chamber with an inlet opening therebetween;

juxtaposing the inlet opening with the burner flame so as to create a venturi effect;

drawing smoke from the housing upper portion, through the inlet opening, and into the combustion chamber, by the venturi effect;

heating the smoke with the flame, within the combustion chamber;

converting the smoke to invisible exhaust gases with the heating;

communicating the combustion chamber to atmosphere with a flue; and venting the exhaust gases to the atmosphere through the flue.

Further steps comprise:

juxtaposing an igniter with the burner;

lighting off the burner flame with the igniter;

enclosing a wall of the combustion chamber with a cover;

defining a cover space between the combustion chamber wall and the cover;

communicating the flue with the cover space through a hole in the flue;

drawing air from the cover space into the flue through the hole by venturi effect;

cooling the cover space with the air drawn through the hole;

mounting an inlet grating over the inlet opening for safety;

mounting a screen in the flue to exclude insects from the incinerator;

Yet further steps are:

connecting a grin burner control between the grill burner and a fuel supply;

regulating the flow of fuel to the grill burner with the grill burner control;

connecting an incinerator burner control between the incinerator burner and the fuel supply;

regulating the flow of fuel to the incinerator burner with the incinerator burner control; and locking the grill burner control until the incinerator burner is ignited, thereby preventing unignited fuel from accumulating in the housing.

Still further steps are:

attaching an upper hinge element to the housing upper portion;

attaching a lower hinge element to the housing lower portion;

connecting the upper hinge element to the lower hinge element with a hinge pin;

pivoting the housing upper portion on the hinge pin from a closed pivotal position to an open pivotal position;

attaching a support lug to one of the hinge elements;

supporting the housing upper portion in a partially open pivotal position with the support lug, wherein the housing chamber is visible; and collecting the smoke in the housing upper portion in the partially open pivotal position.

BRIEF DESCRIPTION OF THE DRAWING

The invention will be more fully understood, while still further features and advantages will become apparent, in the following detailed description of preferred embodiments thereof illustrated in the accompanying drawing, in which.

DESCRIPTION OF THE PREFERRED EMBODIMENTS

Figure 1:
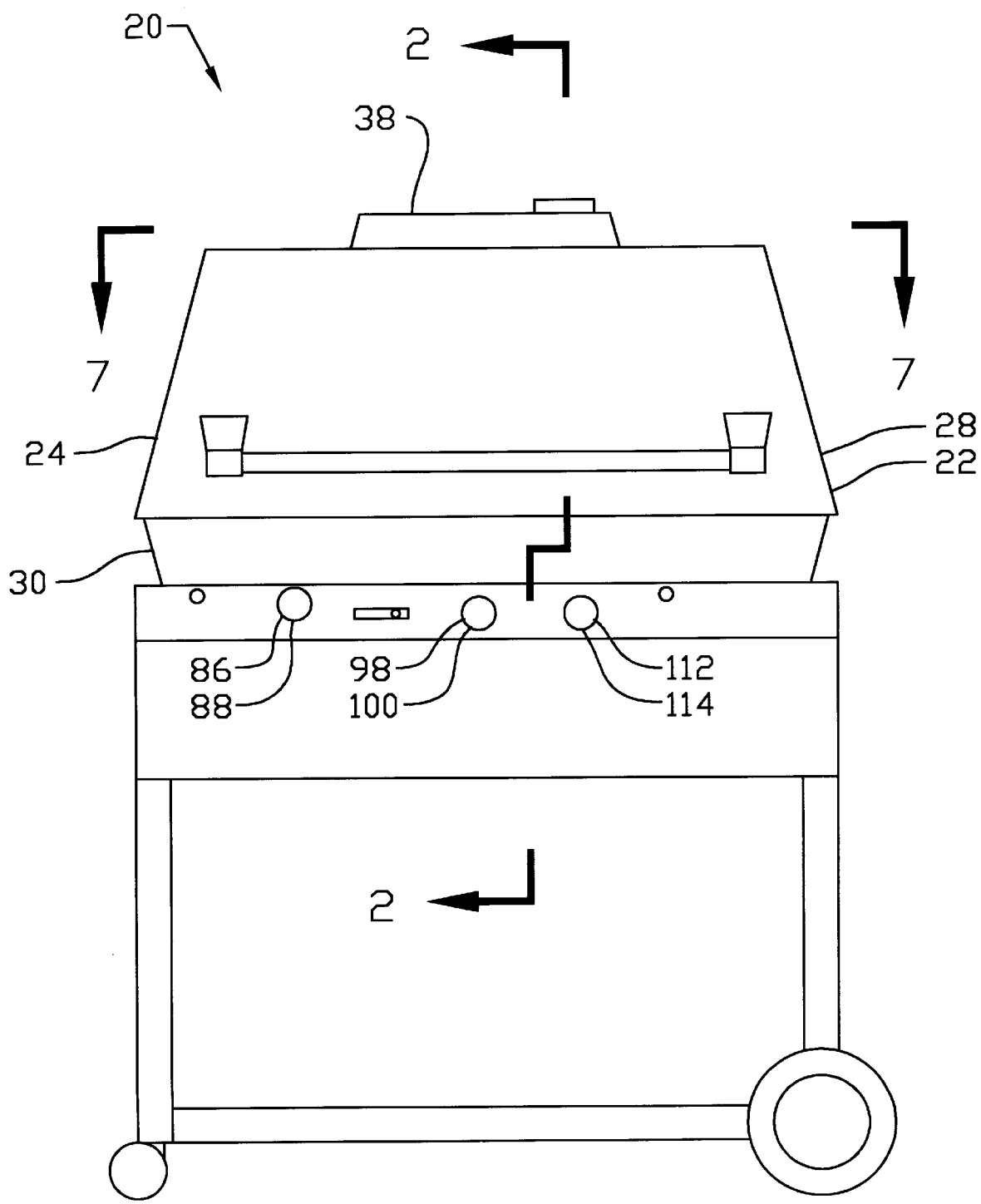
FIG. 1 is a front elevational view of a barbecue grill with smoke incinerator constructed in accordance with the invention.
Figure 2:
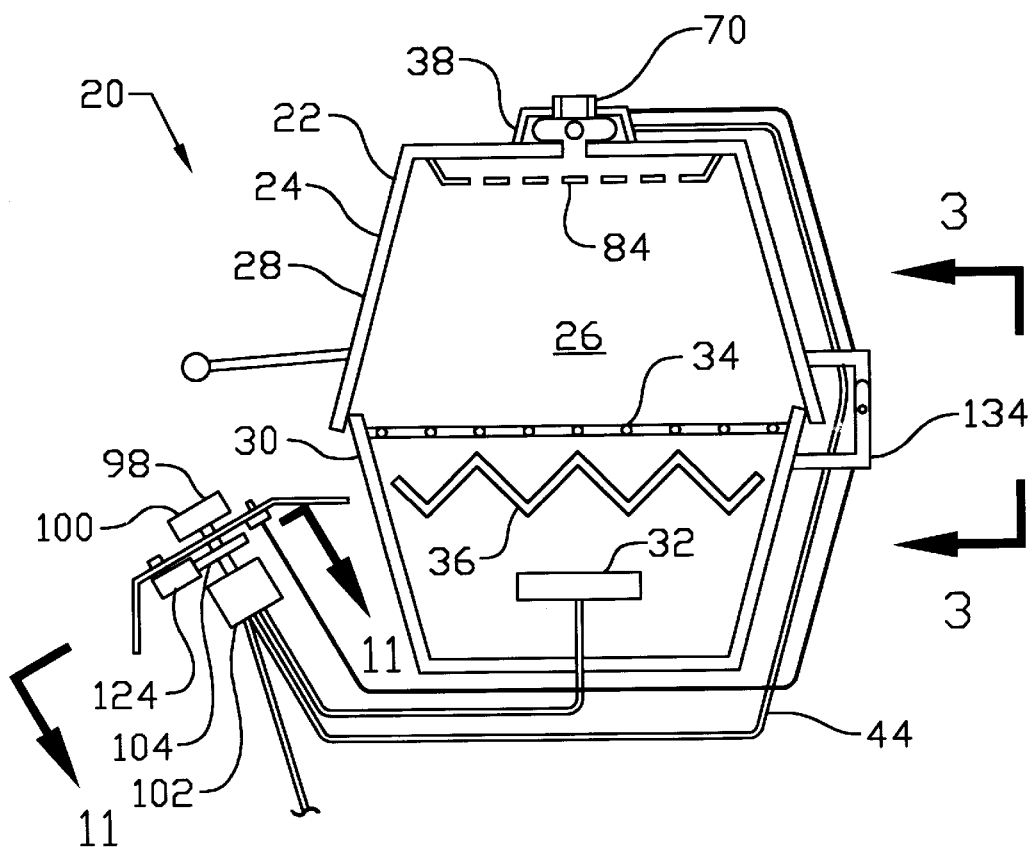
FIG. 2 is a partial cross-sectional elevational view of the barbecue grill of FIG. 1, taken along lines 2—2 of FIG. 1.
Figure 3:
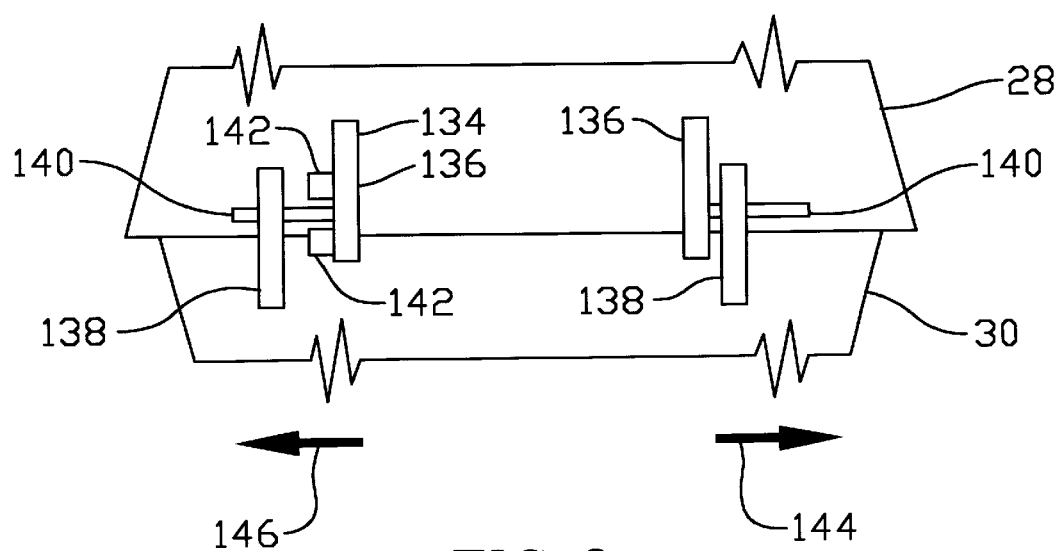
FIG. 3 is a partial rear elevational view of the barbecue grill of FIG. 2, taken along lines 3—3 of FIG. 2.

Referring now to the drawing, and especially to FIGS. 1, and 2 thereof, a barbecue grill with smoke incinerator is shown at 20. The grill comprises a cooking unit 22, which includes a housing 24 defining a housing chamber 26. The housing 24 has an upper portion 28 and a lower portion 30. The cooking unit 22 includes a grill burner 32 disposed within the housing 24, and a cooking grate 34 disposed within the housing 24 and above the grill burner 32. An optional component is a fire grate 36 disposed between the grill burner 32 and the cooking grate 34.

Turning now to FIGS. 7,8,9, and 10, as well as 1 and 2, a smoke incinerator 38 is mounted on the housing upper portion 28. The smoke incinerator 38 has an incinerator burner 40 for generating a flame 42, so as to convert smoke to invisible exhaust gases by heating the smoke with the flame 42. The incinerator burner 40 is supplied with fuel by incinerator fuel line 44. The fuel passes into the body 46, as shown by arrow 47 in FIG. 9, and through the jet 48 where it combines with air entering the body 46 through an air inlet 50 and inlet screen 52, as shown by arrow 49. The fuel and air enter a gas tube 54 which has a helical vane 56 inside it for creating turbulence to ensure thorough mining of the fuel and air upstream of the flame 42. The helical vane 56 is shown in cross-section in FIG. 10. The flame 42 exits through a nozzle 58 into a combustion chamber 60 which communicates with the burner 40. An igniter 59 is juxtaposed with the burner 40, to light off the burner flame. The combustion chamber 60 has a wall 62, with an inlet opening 64 communicating the combustion chamber 60 with the housing chamber 26. The inlet opening 64 is juxtaposed with the burner flame 42 so as to create a venturi effect to draw smoke, as shown by arrow 66 in FIG. 8, from the housing upper portion 28, through the inlet opening 64, and into the combustion chamber 60. There, the smoke is heated by the flame 42, converting the visible smoke particles into invisible gases, shown by arrow 68. The smoke incinerator 38 has a flue 70 communicating with the combustion chamber 60, for venting the invisible exhaust gases to the atmosphere.

A cover 72 encloses the combustion chamber wall 62, and defines a cover space 74 between the combustion chamber wall 62 and the cover 72. First 76 and second 78 screens are mounted in tandem in the flue 70 to exclude insects from the incinerator 38. The flue 70 has a hole 80 therethrough between the first 76 and second 78 screens. The hole 80 communicates the flue 70 with the cover space 74, so as to draw air, as shown by arrow 82 in FIG. 8, from the cover space 74 into the flue 70 by venturi effect thereby cooling the cover space 74. An inlet grating 84 is provided which has a plurality of holes therethrough. The inlet grating 84 is mounted over the inlet opening 64 from within the housing upper portion 28, for safety.

Figure 11:
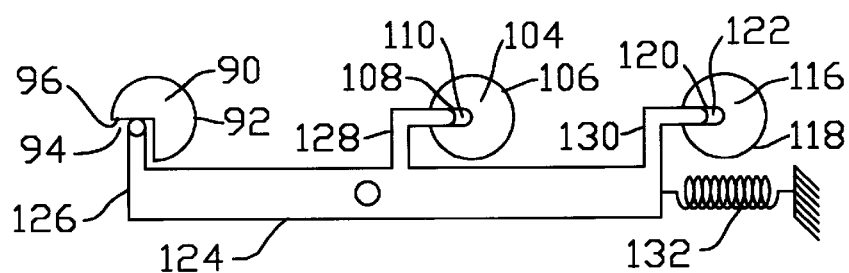
FIG. 11 is a partial, cross-sectional elevational view of FIG. 2, taken along lines 11—11 of FIG. 2, and showing the burner locking mechanism.
Figure 12:
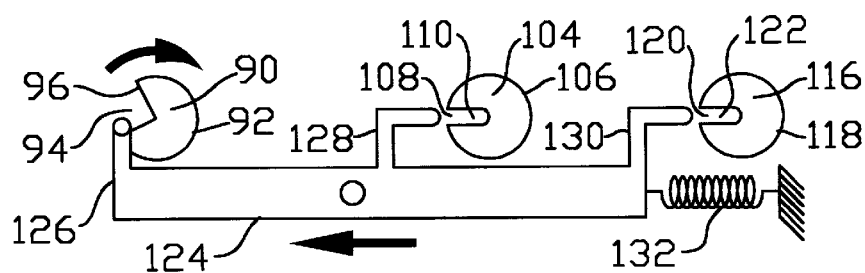
FIG. 12 is the same view as that of FIG. 11, and showing the mechanism in a different position.
Figure 13:
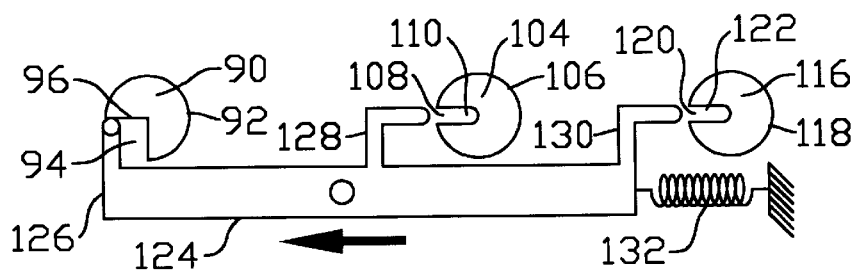
FIG. 13 is the same view as that of FIG. 11, and showing the mechanism in a yet different position.

Referring now to FIGS. 11,12, and 13, as well as FIGS. 1 and 2, the barbecue grill 20 is provided with a fuel supply (not shown). An incinerator burner control 86 connects the incinerator burner 40 with the fuel supply, to regulate the flow of fuel to the incinerator burner 40. The incinerator burner control 86 includes control knob 88, a control valve (not shown), and a first rotary element 90, for fuel flow adjustment. The first rotary element 90 has a turned-on mode in which fuel will flow, and a shutoff mode, in which fuel will not flow. The first rotary element 90 also has a periphery 92, with a notch 94 extending around generally one quarter of the periphery, the notch having generally perpendicular edges 96.

A grill burner control 98 connects the grill burner 32 with the fuel supply, to regulate the flow of fuel to the grill burner 32. The grill burner control 98 includes a control knob 100, a control valve 102, and a second rotary element 104 for fuel flow adjustment. The second rotary element 104 has a turned-on mode in which fuel will flow, and a shutoff mode, in which fuel will not flow. The second rotary element 104 has a periphery 106, with a generally radial notch 108, the notch having generally parallel edges 110.

An optional third burner control 112 connects a twin grill burner (not shown) with the fuel supply, to regulate the flow of fuel to the twin grill burner in a dual burner configuration. The third grill burner control 112 includes a control knob 114, a control valve (not shown), and a third rotary element 116 for fuel flow adjustment. The third rotary element 116 has a turned-on mode in which fuel will flow, and a shutoff mode, in which fuel will not flow. The third rotary element 116 has a periphery 118, with a generally radial notch 120, the notch having generally parallel edges 122.

A burner locking means is provided, which typically comprises a locking bar 124 juxtaposed with the first 90 and second 104 rotary elements. The locking bar 124 is slidingly mounted for movement in a direction of sliding generally parallel to the second rotary element notch 108 when the second rotary element 104 is in the shutoff mode. The locking bar 124 has first 126 and second 128 members and an optional third member 130, projecting outward therefrom. The second 128 and third 130 members extend generally parallel to the direction of sliding. The locking bar first member 126 engages the first rotary element notch 94. The locking bar 124 is movable from a first position to a second position, in response to rotation of the first rotary element 90. In the first position, shown in FIG. 11, the first rotary element 90 is in shutoff mode and the locking bar second member 128 engages the second rotary element notch 108 such that the second rotary element 104 will not rotate, thereby locking the second rotary element 104 in shutoff mode. Similarly, the third rotary element 116 is in shutoff mode. In the second position, shown in FIG. 12, the first rotary element 90 allows fuel flow to the incinerator burner 40, and the locking bar second member 128 moves out of engagement with the second rotary element notch 108, allowing fuel to flow to the grill burner 32. Likewise, the locking bar third member 130 moves out of engagement with the third rotary element notch 120, allowing fuel to flow to the twin grill burner. A spring 132 is provided for biasing the locking bar 124 into the first position. The burner locking means will prevent unignited fuel from accumulating in the housing chamber 26 in the event that the incinerator burner 40 fails to ignite.

Turning now to FIGS. 2,3,4,5, and 6, the barbecue grill 20 is provided with a mounting means, specifically a hinge 134. The hinge 134 has a pair of hinge elements, including an upper hinge element 136 attached to the housing upper portion 28, and a lower hinge element 138 attached to the housing lower portion 30. One hinge element of the pair of hinge elements is juxtaposed opposite one other hinge element of the pair of hinge elements. The hinge 134 has a hinge pin 140 with a longitudinal axis. The hinge pin 140 pivotally connects the upper hinge element 136 to the lower hinge element 138. This allows pivotal movement of the housing upper portion 28 from a closed pivotal position, shown in FIG. 2, to an open pivotal position (not shown), giving access to the cooking grate 34.

Figure 4:
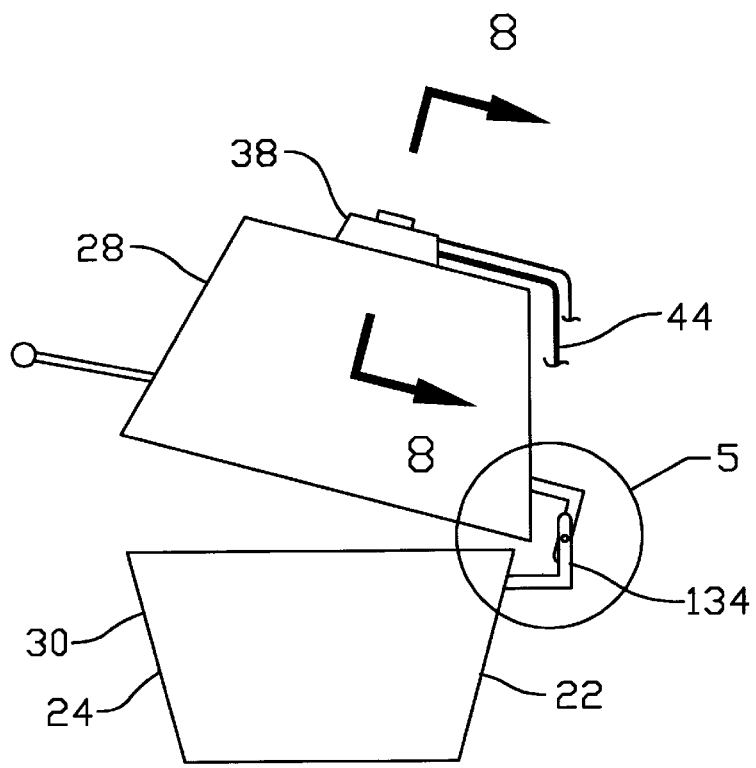
FIG. 4 is a partial right side elevational view of the barbecue grill of FIG. 1, showing the housing upper portion in a partially open pivotal position.
Figures 5, 6:
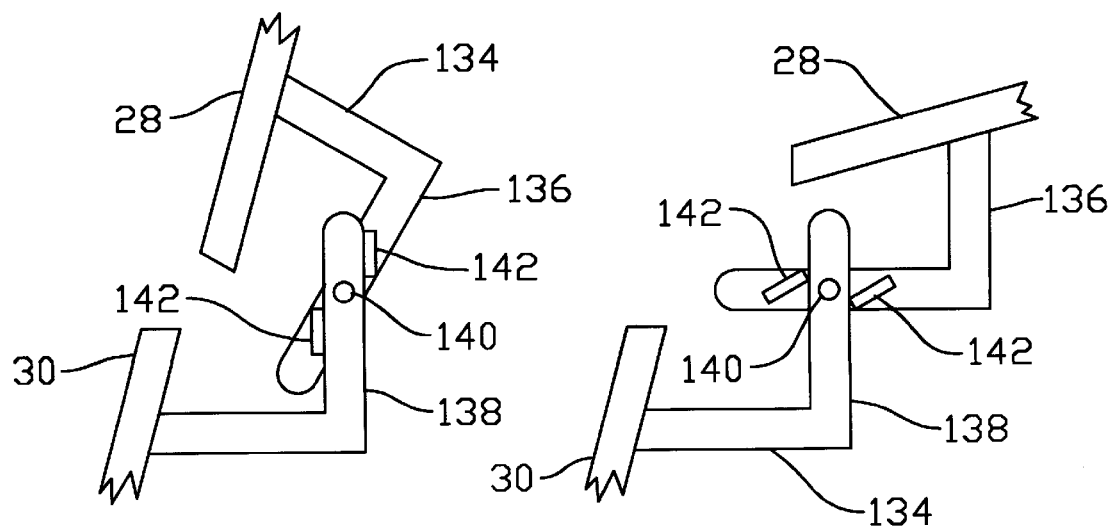
FIG. 5 is an enlarged view of detail 5 of FIG. 4, showing the hinge in the partially open pivotal position.
FIG. 6 is another enlarged view of detail 5 of FIG. 4, showing the hinge in the fully open pivotal position.
Figure 7:
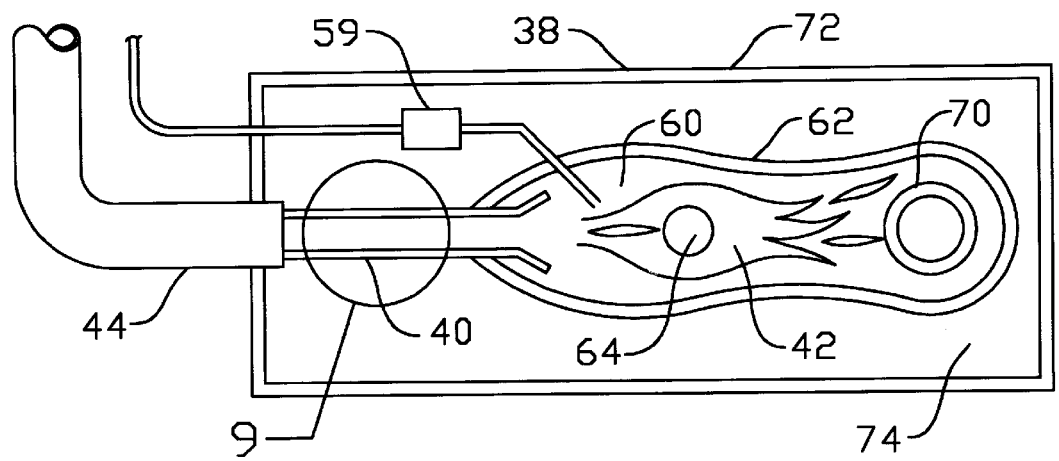
FIG. 7 is a partial, cross-sectional plan view of FIG. 1, taken along lines 7—7 of FIG. 1, and showing the smoke incinerator.
Figure 8:
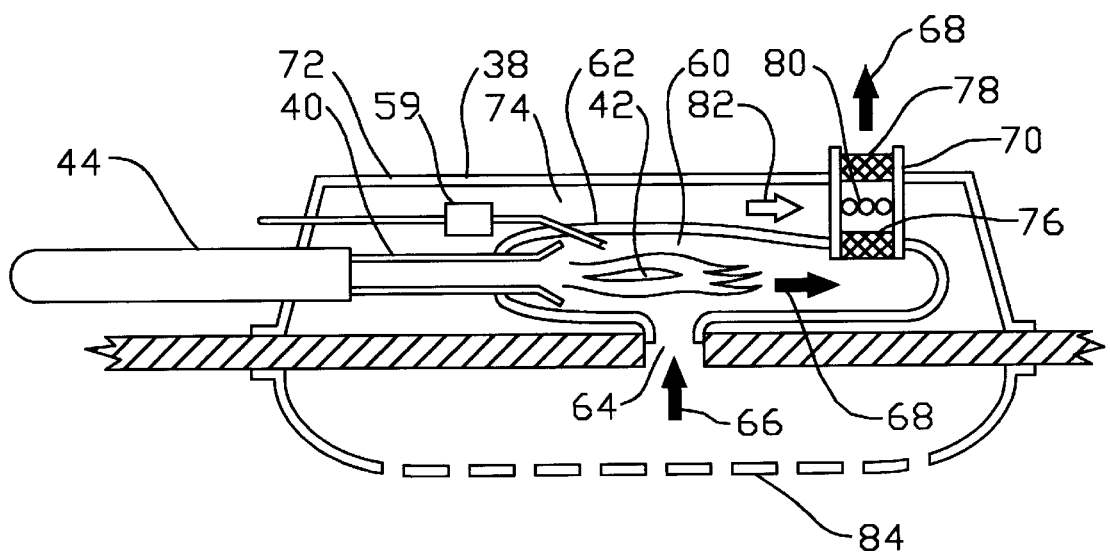
FIG. 8 is a partial, cross-sectional elevational view of FIG. 4, taken along lines 8—8 of FIG. 4, and showing the smoke incinerator.
Figure 9:
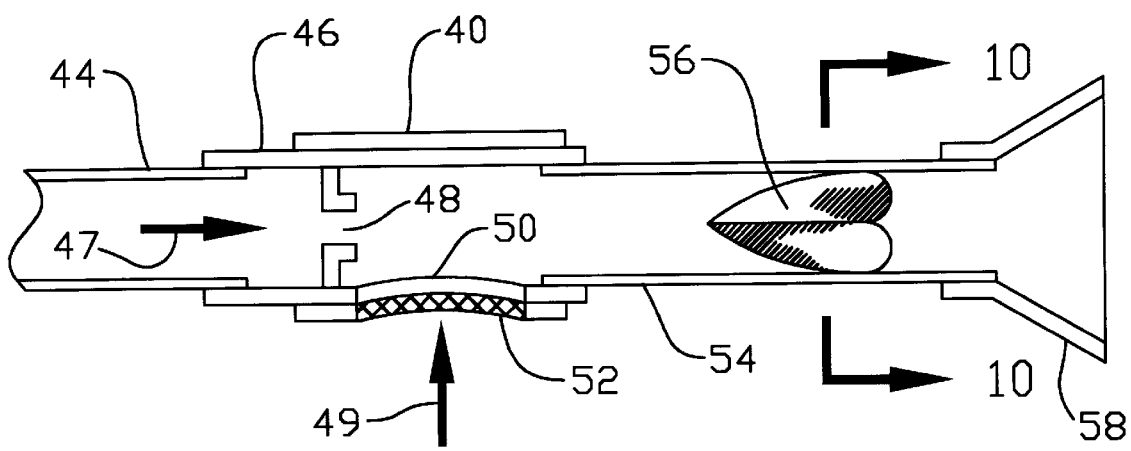
FIG. 9 is an enlarged view of detail 9 of FIG. 7, showing the incinerator burner.
Figure 10:
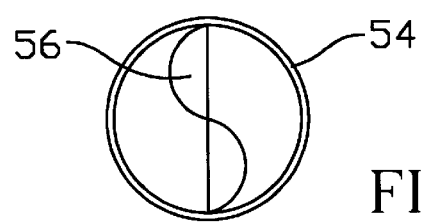
FIG. 10 is a cross-sectional elevational view of FIG. 9, taken along lines 10—10 of FIG. 9.

Supporting means is provided for supporting the housing upper portion 28 in a partially open pivotal position, shown in FIG. 4, wherein the housing chamber 26 is visible, the cooking grate 34 is accessible, and the housing upper portion 28 will collect the smoke. The supporting means typically comprises a support lug 142 attached to the one hinge element of the pair of hinge elements. The drawing shows the support lug 142 attached to the upper hinge element 136, but the lug could be attached to the lower hinge element 138. A second support lug 142 could be added, as shown, to provide support in the event that one should break. The hinge pin 140 is mounted for sliding movement along the longitudinal axis, enabling the housing upper portion 28 to slide laterally from a first lateral position, shown by arrow 144, to a second lateral position, shown by arrow 146. In the first lateral position, the housing upper portion 28 will pivot freely from the open pivotal position to the closed pivotal position. In the second lateral position, the support lug 142 will engage the other hinge element of the pair of hinge elements, in this case the lower hinge element 138, and support the housing upper portion 28 in the partially open pivotal position.

Although the invention has been described and illustrated in the preferred embodiments, those skilled in the art will make changes that will be seen to be functional equivalents to the present invention. It is therefore to be understood that the above detailed description of embodiments of the invention is provided by way of example only. Various details of design and construction may be modified without departing from the true spirit and scope of the invention as set forth in the appended claims.

PARTS LIST
BARBECUE GRILL WITH SMOKE INCINERATOR

| PART NO. | DESCRIPTION |
| --- | --- |
| 20 | barbecue grill |
| 22 | cooking unit |
| 24 | housing |
| 26 | housing chamber |
| 28 | upper portion |
| 30 | lower portion |
| 32 | grill burner |
| 34 | cooking grate |
| 36 | fire grate |
| 38 | smoke incinerator |
| 40 | incinerator burner |
| 42 | flame |
| 44 | incinerator fuel line |
| 46 | body |
| 47 | fuel arrow |
| 48 | jet |
| 49 | air arrow |
| 50 | air inlet |
| 52 | inlet screen |
| 54 | gas tube |
| 56 | helical vane |
| 58 | nozzle |
| 59 | igniter |
| 60 | combustion chamber |
| 62 | wall |
| 64 | inlet opening |
| 66 | smoke arrow |
| 68 | exhaust gases arrow |
| 70 | flue |
| 72 | cover |
| 74 | cover space |
| 76 | first screen |
| 78 | second screen |
| 80 | hole |
| 82 | air arrow |
| 84 | inlet grating |
| 86 | incinerator burner control |
| 88 | control knob |
| 90 | first rotary element |
| 92 | periphery |
| 94 | notch |
| 96 | notch edges |
| 98 | grill burner control |
| 100 | control knob |
| 102 | control valve |
| 104 | second rotary element |
| 106 | periphery |
| 108 | radial notch |
| 110 | parallel edges |
| 112 | third burner control |
| 114 | control knob |
| 116 | third rotary element |
| 118 | periphery |
| 120 | radial notch |
| 122 | parallel edges |
| 124 | locking bar |
| 126 | first member |
| 128 | second member |
| 130 | third member |
| 132 | spring |
| 134 | hinge |
| 136 | upper hinge element |

-continued

PARTS LIST
BARBECUE GRILL WITH SMOKE INCINERATOR

| PART NO. | DESCRIPTION |
| --- | --- |
| 138 | lower hinge element |
| 140 | hinge pin |
| 142 | support lug |
| 144 | first lateral position arrow |
| 146 | second lateral position arrow |

The embodiments of the invention in which an exclusive property or privilege is claimed are defined as follows:

1. A barbecue grill, comprising:
   (a) a cooking unit, the cooking unit including a housing defining a housing chamber, the housing having an upper portion and a lower portion, the cooking unit including a grill burner disposed within the housing, and a cooking grate disposed within the housing and above the grill burner;
   (b) mounting means for mounting the housing upper portion on the housing lower portion; and
   (c) a smoke incinerator mounted on the housing upper portion, the smoke incinerator having an incinerator burner for generating a flame, so as to convert smoke to invisible exhaust gases by heating the smoke with the flame.

2. The barbecue grill of claim 1, wherein the smoke incinerator further comprises:
   (a) a combustion chamber communicating with the burner, the combustion chamber having a wall, the wall having an inlet opening communicating the combustion chamber with the housing chamber, the inlet opening being juxtaposed with the burner flame so as to create a venturi effect to draw smoke from the housing upper portion, through the inlet opening, and into the combustion chamber; and
   (b) a flue communicating with the combustion chamber, for venting the exhaust gases to the atmosphere.

3. The barbecue grill of claim 2, wherein the smoke incinerator further comprises an igniter juxtaposed with the burner, to light off the burner flame.

4. The barbecue grill of claim 2, wherein the incinerator burner further comprises a helical vane for creating turbulence to ensure thorough mixing of the fuel and air upstream of the flame.

5. The barbecue grill of claim 2, wherein the smoke incinerator further comprises:
   (a) a cover enclosing the combustion chamber wall, and defining a cover space between the combustion chamber wall and the cover;
   (b) an inlet grating having a plurality of holes therethrough, the inlet grating mounted over the inlet opening from within the housing upper portion, for safety; and
   (c) first and second screens mounted in tandem in the flue to exclude insects from the incinerator, the flue having a hole therethrough between the first and second screens, the hole communicating the flue with the cover space, so as to draw air from the cover space into the flue by venturi effect, thereby cooling the cover space.

6. The barbecue grill of claim 1, further comprising:
   (a) a fuel supply;
   (b) a grill burner control connecting the grill burner with the fuel supply, to regulate the flow of fuel to the grill burner;
   (c) an incinerator burner control connecting the incinerator burner with the fuel supply, to regulate the flow of fuel to the incinerator burner; and
   (d) burner locking means for locking the grill burner control until the incinerator burner is ignited, so as to prevent unignited fuel from accumulating in the housing.

7. The barbecue grill of claim 6, wherein:
   (a) the incinerator burner control includes a first rotary element for fuel flow adjustment, the first rotary element having a shutoff mode, the first rotary element having a periphery, and the periphery having a notch extending around generally one quarter of the periphery, the notch having generally perpendicular edges;
   (b) the grill burner control includes a second rotary element for fuel flow adjustment, the second rotary element having a shutoff mode, the second rotary element having a periphery, and the periphery having a generally radial notch, the notch having generally parallel edges; and
   (c) the burner locking means further comprises a locking bar juxtaposed with the first and second rotary elements, the locking bar being slidingly mounted for movement in a direction of sliding generally parallel to the second rotary element notch when the second rotary element is in the shutoff mode, the locking bar having first and second members projecting outward therefrom, the second member extending generally parallel to the direction of sliding, the locking bar first member engaging the first rotary element notch, the locking bar being movable, in response to rotation of the first rotary element, from a first position wherein the first rotary element is in shutoff mode and the locking bar second member engages the second rotary element notch such that the second rotary element will not rotate, thereby locking the second rotary element in shutoff mode, to a second position wherein the first rotary element allows fuel flow to the incinerator burner, and the locking bar second member moves out of engagement with the second rotary element notch, allowing fuel to flow to the grill burner, so as to prevent unignited fuel from accumulating in the housing chamber in the event that the incinerator burner fails to ignite.

8. The barbecue grill of claim 1, wherein the mounting means further comprises a hinge, including:
   (a) a pair of hinge elements, including an upper hinge element attached to the housing upper portion, and a lower hinge element attached to the housing lower portion, wherein one hinge element of the pair of hinge elements is juxtaposed opposite one other hinge element of the pair of hinge elements;
   (b) a hinge pin having a longitudinal axis, the hinge pin pivotally connecting the upper hinge element to the lower hinge element for pivotal movement of the housing upper portion from a closed pivotal position to an open pivotal position; and
   (c) supporting means for supporting the housing upper portion in a partially open pivotal position wherein the housing chamber is visible and the housing upper portion will collect the smoke.

9. The barbecue grill of claim 8, wherein:
   (a) the supporting means further comprises a support lug attached to the one hinge element of the pair of hinge elements; and (b) the hinge pin is mounted for sliding movement along the longitudinal axis, enabling the housing upper portion to slide laterally from a first lateral position, wherein the housing upper portion will pivot freely from the open pivotal position to the closed pivotal position, to a second lateral position, wherein the support lug will engage the other hinge element of the pair of hinge elements and support the housing upper portion in the partially open pivotal position.

10. A barbecue grill, comprising:

(a) a cooking unit, the cooking unit including a housing defining a housing chamber, the housing having an upper portion and a lower portion, the cooking unit including a grill burner disposed within the housing, and a cooking grate disposed within the housing and above the grill burner;

(b) a smoke incinerator mounted on the housing upper portion, the smoke incinerator having an incinerator burner for generating a flame, so as to convert smoke to invisible exhaust gases by heating the smoke with the flame, the smoke incinerator having a combustion chamber communicating with the burner, the combustion chamber having a wall, the wall having an inlet opening communicating the combustion chamber with the housing chamber, the inlet opening being juxtaposed with the burner flame so as to create a venturi effect to draw smoke from the housing upper portion, through the inlet opening, and into the combustion chamber, the smoke incinerator having a flue communicating with the combustion chamber, for venting the exhaust gases to the atmosphere;

(c) a fuel supply;

(d) a grill burner control connecting the grill burner with the fuel supply, to regulate the flow of fuel to the grill burner;

(e) an incinerator burner control connecting the incinerator burner with the fuel supply, to regulate the flow of fuel to the incinerator burner;

(f) a hinge having a pair of hinge elements, including an upper hinge element attached to the housing upper portion, and a lower hinge element attached to the housing lower portion, wherein one hinge element of the pair of hinge elements is juxtaposed opposite one other hinge element of the pair of hinge elements, the hinge having a hinge pin with a longitudinal axis, the hinge pin pivotally connecting the upper hinge element to the lower hinge element for pivotal movement of the housing upper portion from a closed pivotal position to an open pivotal position; and (g) supporting means for supporting the housing upper portion in a partially open pivotal position wherein the housing chamber is visible and the housing upper portion will collect the smoke.

11. The barbecue grill of claim 10, wherein the smoke incinerator further comprises an igniter juxtaposed with the burner, to light off the burner flame.

12. The barbecue grill of claim 10, wherein the incinerator burner further comprises a helical vane for creating turbulence to ensure thorough mixing of the fuel and air upstream of the flame.

13. The barbecue grill of claim 10, wherein the smoke incinerator further comprises:

(a) a cover enclosing the combustion chamber wall and defining a cover space between the combustion chamber wall and the cover;

(b) an inlet grating having a plurality of holes therethrough, the inlet grating being mounted over the inlet opening from within the housing upper portion, for safety; and (c) first and second screens mounted in tandem in the flue to exclude insects from the incinerator, the flue having a hole therethrough between the first and second screens, the hole communicating the flue with the cover space, so as to draw air from the cover space into the flue by venturi effect, thereby cooling the cover space.

14. The barbecue grill of claim 10, wherein:

(a) the incinerator burner control includes a first rotary element for fuel flow adjustment the first rotary element having a shutoff mode, the first rotary element having a periphery, and the periphery having a notch extending around generally one quarter of the periphery, the notch having generally perpendicular edges;

(b) the grill burner control includes a second rotary element for fuel flow adjustment, the second rotary element having a shutoff mode, the second rotary element having a periphery, and the periphery having a generally radial notch, the notch having generally parallel edges; and (c) the burner locking means further comprises a locking bar juxtaposed with the first and second rotary elements, the locking bar being slidingly mounted for movement in a direction of sliding generally parallel to the second rotary element notch when the second rotary element is in the shutoff mode, the locking bar having first and second members projecting outward therefrom, the second member extending generally parallel to the direction of sliding, the locking bar first member engaging the first rotary element notch, the locking bar being movable, in response to rotation of the first rotary element, from a first position wherein the first rotary element is in shutoff mode and the locking bar second member engages the second rotary element notch such that the second rotary element will not rotate, thereby locking the second rotary element in shutoff mode, to a second position wherein the first rotary element allows fuel flow to the incinerator burner, and the locking bar second member moves out of engagement with the second rotary element notch, allowing fuel to flow to the grill burner, so as to prevent unignited fuel from accumulating in the housing chamber in the event that the incinerator burner fails to ignite.

15. The barbecue grill of claim 10, wherein:

(a) the supporting means further comprises a support lug attached to the one hinge element of the pair of hinge elements; and (b) the hinge pin is mounted for sliding movement along the longitudinal axis, enabling the housing upper portion to slide laterally from a first lateral position, wherein the housing upper portion will pivot freely from the open pivotal position to the closed pivotal position, to a second lateral position, wherein the support lug will engage the other hinge element of the pair of hinge elements and support the housing upper portion in the partially open pivotal position.

16. A method of eliminating smoke from a barbecue grill having a cooking unit, the cooking unit including a housing defining a housing chamber, the housing having an upper portion and a lower portion, the cooking unit including a grill burner disposed within the housing, and a cooking grate disposed within the housing and above the grill burner, the method comprising the steps of:

(a) mounting a smoke incinerator on the housing upper portion;

(b) generating a flame with an incinerator burner;

(c) communicating the burner with a combustion chamber;

(d) communicating the combustion chamber and the housing chamber with an inlet opening therebetween;

(e) juxtaposing the inlet opening with the burner flame so as to create a venturi effect;

(f) drawing smoke from the housing upper portion, through the inlet opening, and into the combustion chamber, by the venturi effect;

(g) heating the smoke with the flame, within the combustion chamber;

(h) converting the smoke to invisible exhaust gases with the heating;

(i) communicating the combustion chamber to atmosphere with a flue; and (j) venting the exhaust gases to the atmosphere through the flue.

17. The method of claim 16, further comprising the steps of:

(a) juxtaposing an igniter with the burner; and (b) lighting off the burner flame with the igniter.

18. The method of claim 16, further comprising the steps of:

(a) enclosing a wall of the combustion chamber with a cover;

(b) defining a cover space between the combustion chamber wall and the cover;

(c) communicating the flue with the cover space through a hole in the flue;

(d) drawing air from the cover space into the flue through the hole by venturi effect;

(e) cooling the cover space with the air drawn through the hole;

(f) mounting an inlet grating over the inlet opening for safety; and (g) mounting a screen in the flue to exclude insects from the incinerator.

19. The method of claim 16, further comprising the steps of:

(a) connecting a grill burner control between the grill burner and a fuel supply;

(b) regulating the flow of fuel to the grill burner with the grill burner control;

(c) connecting an incinerator burner control between the incinerator burner and the fuel supply;

(d) regulating the flow of fuel to the incinerator burner with the incinerator burner control; and (e) locking the grill burner control until the incinerator burner is ignited, thereby preventing unignited fuel from accumulating in the housing chamber.

20. The method of claim 16, further comprising the steps of:

(a) attaching an upper hinge element to the housing upper portion;

(b) attaching a lower hinge element to the housing lower portion;

(c) connecting the upper hinge element to the lower hinge element with a hinge pin;

(d) pivoting the housing upper portion on the hinge pin from a closed pivotal position to an open pivotal position;

(e) attaching a support lug to one of the hinge elements;

(f) supporting the housing upper portion in a partially open pivotal position with the support lug, wherein the housing chamber is visible; and (g) collecting the smoke in the housing upper portion in the partially open pivotal position.

* * * * *